E. J. SMITH.
WATER-ELEVATOR.

No. 178,475. Patented June 6, 1876.

WITNESSES:
F. M. Burnham.
R. M. Barr.

INVENTOR:
E. J. Smith
per
F. A. Lehmann, Atty.

UNITED STATES PATENT OFFICE.

EDGAR J. SMITH, OF PILOT POINT, TEXAS.

IMPROVEMENT IN WATER-ELEVATORS.

Specification forming part of Letters Patent No. 178,475, dated June 6, 1876; application filed December 4, 1875.

*To all whom it may concern:*

Be it known that I, EDGAR J. SMITH, of Pilot Point, Denton county, Texas, have invented a new and Improved Water-Elevator, of which the following is a specification:

My invention consists of an endless chain of buckets on a reel for working them, so contrived that it tilts the buckets so that they empty and pass the spout without revolving, whereby the contrivance is simpler and better than when they are made to revolve, and the buckets are linked together by a novel contrivance for carrying them, to enter the water bottom downward, and to allow the air to escape when filling.

Figure 1:
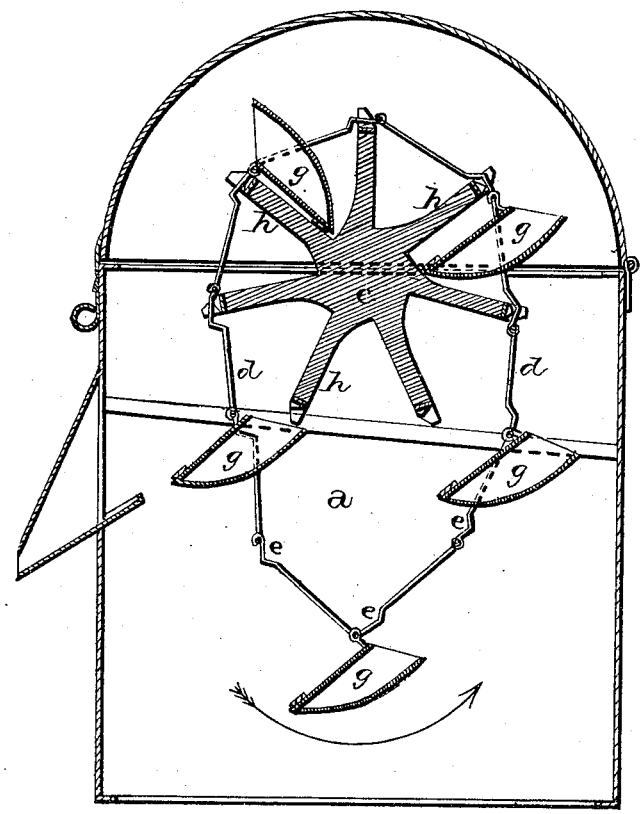
Figure 2:
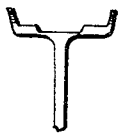

Figure 1 is a vertical section of my invention. Fig. 2 is a detail view of one of the arms of the wheel.

$a$ represents the casing or frame, which is constructed in any desired manner. Journaled in this frame upon a suitable shaft is the wheel $c$, the arms of which have their outer ends branched, as shown in Fig. 2, so as to keep the chain $d$ in position upon them. This chain is formed of a series of long links, each one of which is bent at its lower end, as shown at $e$, so as to just fit the shape of the arm of the wheel. As the arms $h$ of the wheel all extend back, so that the weight of the buckets $g$ causes them to swing forward against the arms, and upon which arms the lower end of the bucket is supported until the arm gets so low down that the bucket slips off, as soon as the bucket slips off from the arm it at once assumes the position shown, ready to dip down into the water.

Having thus described my invention, I claim—

In a water-elevator, the combination of the wheel $c$, having the notched, backwardly-inclined arms $h$, the chain $d$, having its links bent at $e$, and the buckets $g$, substantially as shown and described.

EDGAR JAMISON SMITH.

Witnesses:
  M. N. SEVIER,
  J. M. BROOKS.